US009247327B2

(12) United States Patent
Patel et al.

(10) Patent No.: US 9,247,327 B2
(45) Date of Patent: Jan. 26, 2016

(54) SUURBALLE-BASED CLOUD SERVICE EMBEDDING PROCEDURE IN SOFTWARE-DEFINED FLEXIBLE-GRID OPTICAL TRANSPORT NETWORKS

(71) Applicant: NEC Laboratories America, Inc., Princeton, NJ (US)

(72) Inventors: Ankitkumar Patel, Monmouth Junction, NJ (US); Philip Nan Ji, Cranbury, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/510,163

(22) Filed: Oct. 9, 2014

(65) Prior Publication Data

US 2015/0104166 A1    Apr. 16, 2015

Related U.S. Application Data

(60) Provisional application No. 61/889,115, filed on Oct. 10, 2013.

(51) Int. Cl.
*H04J 14/02*   (2006.01)
*H04Q 11/00*   (2006.01)
*H04L 12/707*  (2013.01)
*H04L 12/721*  (2013.01)
*H04L 12/735*  (2013.01)

(52) U.S. Cl.
CPC ........ *H04Q 11/0066* (2013.01); *H04J 14/0295* (2013.01); *H04L 45/128* (2013.01); *H04L 45/22* (2013.01); *H04L 45/62* (2013.01); *H04Q 2011/0073* (2013.01); *H04Q 2011/0081* (2013.01); *H04Q 2011/0086* (2013.01)

(58) Field of Classification Search
CPC ................. H04Q 11/0066; H04Q 2011/0073; H04Q 2011/0081; H04Q 2011/0086; H04J 14/0295; H04L 45/128; H04L 45/62; H04L 45/22
USPC ................................................. 398/5, 25, 58
See application file for complete search history.

(56) References Cited

U.S. PATENT DOCUMENTS

| | | | |
|---|---|---|---|
| 6,542,469 B1 | 4/2003 | Kelley et al. | |
| 7,269,346 B1 * | 9/2007 | Iyer ..................... | H04J 14/0283 398/3 |
| 2003/0065811 A1 * | 4/2003 | Lin ..................... | H04L 12/5695 709/232 |
| 2003/0193898 A1 * | 10/2003 | Wong ..................... | H04L 45/00 370/252 |
| 2010/0329120 A1 * | 12/2010 | Zhang ..................... | H04L 45/00 370/238 |
| 2013/0202299 A1 * | 8/2013 | Prakash ............. | H04J 14/0257 398/51 |
| 2013/0315580 A1 * | 11/2013 | Boertjes .............. | H04J 14/0204 398/5 |
| 2014/0099118 A1 * | 4/2014 | Zhang ................. | H04J 14/0257 398/79 |

OTHER PUBLICATIONS

Juan Felipe Botero, 'Study, Evaluation and Contributions to New Algorithms for the Embedding Problem in a Network Virtualization Environment', Universit at Politenica de Catalunya, Department d'Enginyeria Telemtica, Apr. 2013. See p. 13, lines 1-3; p. 15, lines 32-35; and p. 147, lines 28-32; and figure 2.2.

* cited by examiner

*Primary Examiner* — Dalzid Singh
(74) *Attorney, Agent, or Firm* — Joseph Kolodka

(57) ABSTRACT

We propose an efficient procedure, namely disjoint pair procedure based cloud service embedding procedure that first maps working and backup virtual nodes over physical nodes while balancing computational resources of different types, and finally, maps working and backup virtual links over physical routes while balancing network spectral resources using the disjoint pair procedure.

20 Claims, 6 Drawing Sheets

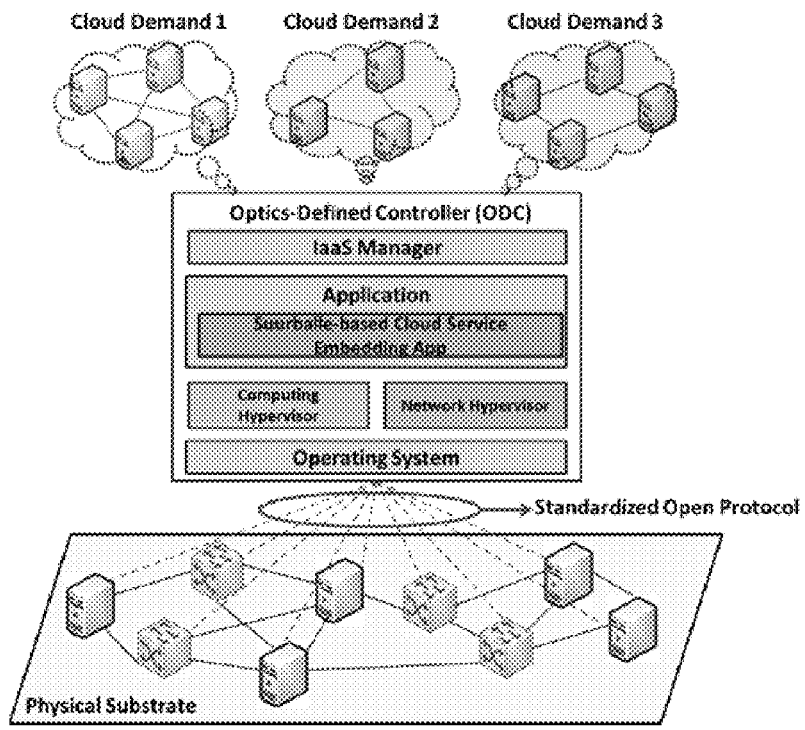
Fig. 1
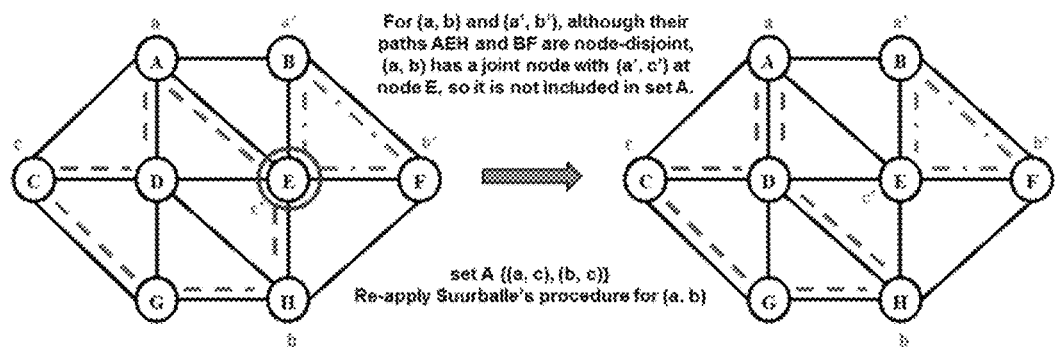
Fig. 3
Fig. 4

Step 119

From Step 131 → 120: Select a VL $(i, j)$ with the maximum required line rate, which does not exist in the set A, and which is not yet considered.

↓

121: Construct an auxiliary graph for the VL $(i, j)$ as follows. In the given PNet, establish auxiliary source and destination nodes. Connect two PNs of the VN $i$ to the auxiliary source node, and the two PNs for the VN $j$ to the auxiliary destination node.

↓

122: Remove the PLs and PNs along the physical routes on which the backup VLs are already mapped from the auxiliary graph. Apply Step 201 to Step 205 of the Suurballe's procedure while considering the cost of a PL as a single hop. Now restore the PLs and PNs along the physical routes on which backup VLs are already mapped, and remove the PLs and PNs along the physical routes on which the working VLs are already mapped from the auxiliary graph. Apply Step 206 to Step 207 of the Suurballe's procedure while considering the cost of a PL as a single hop. Among the found node-disjoint routes, a route that has at least one PL on which at least one of the working VLs is already mapped is considered as the mapping of the working VL and the mapping of the backup VL is considered on the other route. If this is not the case, then among the found node-disjoint routes, a route that has at least one PL on which at least one of the backup VLs is already mapped is considered as the mapping of the backup VL and the mapping of the working VL is considered on the other route. If this is also not the case, then select the shortest route as the mapping of working VL, and the other route as the mapping of backup VL. Record the routes for working VL in $F_{ij}^w$ and backup VL in $F_{ij}^b$.

↓

123: Remove the PLs and PNs along the physical routes on which the backup VLs are already mapped from the auxiliary graph. Apply Step 201 to Step 205 of the Suurballe's procedure while considering the cost of a PL as its physical distance. Now restore the PLs and PNs along the physical routes on which backup VLs are already mapped, and remove the PLs and PNs along the physical routes on which the working VLs are already mapped from the auxiliary graph. Apply Step 206 to Step 207 of the Suurballe's procedure while considering the cost of a PL as its physical distance. Among the found node-disjoint routes, a route that has at least one PL on which at least one of the working VLs is already mapped is considered as the mapping of the working VL and the mapping of the backup VL is considered on the other route. If this is not the case, then among the found node-disjoint routes, a route that has at least one PL on which at least one of the backup VLs is already mapped is considered as the mapping of the backup VL and the mapping of the working VL is considered on the other route. If this is also not the case, then select the shortest route as the mapping of working VL, and the other route as the mapping of backup VL. Record the routes for working VL in $E_{ij}^w$ and backup VL in $E_{ij}^b$.

↓

124: For each of the node-disjoint routes in the solutions, $F_{ij}^w$, $F_{ij}^b$, $E_{ij}^w$, and $E_{ij}^b$, find a modulation format that requires the smallest amount of spectrum while meeting the transmission reach requirement. Among $(F_{ij}^w, F_{ij}^b)$ and $(E_{ij}^w, E_{ij}^b)$, select node-disjoint routes those cumulatively requires the minimum amount of network spectrum. The two node-disjoint routes are denoted as $P_{ij}^w$ and $P_{ij}^b$, and the respective modulation formats for these routes are recorded in $M_{ij}^w$ and $M_{ij}^b$ respectively.

↓

125: Find spectrum required for modulation format $M_{ij}^w$ along the route $P_{ij}^w$ at the lowest available wavelength while observing the wavelength and spectrum continuity constraints and spectrum conflict constraint.

↓

Step 126

Fig. 6

SUURBALLE-BASED CLOUD SERVICE EMBEDDING PROCEDURE IN SOFTWARE-DEFINED FLEXIBLE-GRID OPTICAL TRANSPORT NETWORKS

This application claims priority to provisional application No. 61/889,115 filed Oct. 10, 2013, the contents thereof are incorporated herein by reference.

BACKGROUND OF THE INVENTION

The present invention relates generally to optical communications, and more particularly, to a sustainable based cloud service embedding procedure in software-defined flexible-grid optical transport networks.

Software-Defined Network (SDN) architecture enables network programmability to support multi-vendor, multi-technology, multi-layer communications, and to offer an infrastructure as a service. Recently, efforts are going on to integrate optical transport within IP/Ethernet-based SDN architecture to leverage optical transmission benefits, such as low interference, long reach, and high capacity transmission with lower power consumption. Such a network is referred to as Optical Transport SDN. Optical transport SDN can be realized by enabling flexibility and programmability in transmission and switching network elements, such as transponders and ROADMs, management of optical channels, such as flexible-grid channel mapping, and extracting control plane intelligence from the physical hardware to the centralized controller.

FIG. 1 shows architecture for optical transport SDN in which control plane is abstracted from physical hardware of network elements and most network control and management intelligence now resides into a centralized controller. The centralized controller controls network elements using a standardized protocol, such as OpenFlow over standardized interfaces at controller and network elements. The control plane decisions present in the form of rules, actions, and policies, and network elements applies these decision based on match-action on connections. Thus, optical transport SDN partitions a network into software defined optics (SDO) and optics defined controller (ODC).

Software-defined optics consists of variable rate transponders, flexible-grid channel mapping, and colorless-directionless-contentionless-gridless (CDCG) ROADMs. Variable-rate transponder can be programmed for various modulation formats and FEC coding. Thus, transponders can offer variable transmission capacity for heterogeneous reach requirements. Flexible-grid channel mapping allows an assignment of flexible amount of spectrum to channels to achieve higher spectral efficiency by applying spectrum-efficient modulation formats and eliminating guard bands. CDCG-ROADM can be programmed to switch connections operating on any wavelength with any spectral requirement over any outgoing direction. Furthermore, connections can be added and dropped at a node without contentions. These hardware and their features establishes foundation of SDON optimization and customization capabilities.

Optics defining controller manages the network, and performs network optimization and customization to utilize flexibility of SDO. ODC functionalities are further extracted into network/compute hypervisor, operating system, network applications and database, and debugger and management planes. These planes are isolated by open standardized interfaces to allow simultaneous and rapid innovations at each layer independently. Various control plane functionalities, for example, cloud resource mapping, routing and resource allocation, protection and restoration, defragmentation, energy optimization, etc., are installed as applications and data base in the ODC. Network/compute hypervisor offers virtualization by providing isolation and sharing functions to a data plane as well as an abstract view of network and computing resources while hiding physical layer implementation details to a controller in order to optimize and simplify the network operations. Operating system offers a programmable platform for the execution of applications and hypervisors. Debugger and management plane offers access control and QoS management, while monitoring network performance, and performs fault isolation, localization, and recovery.

Recently, cloud services have gained a lot of interests since it supports applications by sharing resources within existing deployed infrastructure instead of building new ones from scratch. These days network applications are becoming more and more cloud centric, for example social networking applications, such as FaceBook, Twitter, and Google+, e-science applications, such as Large Hadron Collider, content applications, such as NetFlix, and search applications, such as Google and Baidu. Cloud applications are supported by interconnecting various computing, storage, software, and platform-oriented resources within data centers through networks. Each data center is built with the goal of optimizing the type of services offered, for example Google data center is built with the goal of efficient indexing of web pages and minimization of content search time, while Facebook data center is built to offer maximum storage for user contents and efficient management and linking of these contents within user's social group, Amazon EC2 data center is built to offer faster computing time. Thus, one data center may not provide all types of resource, and may not optimally meet all the requirements of a cloud application. Furthermore, failures of any data center, any fiber, or even a ROADM node on which the cloud service is currently active may terminate the entire service. Thus, cloud services must be provisioned with resiliency for computing and network resources.

In such scenarios, open challenges are how to map a cloud request among data centers offering heterogeneous resources, and how to establish network connectivity between data centers. The problem is referred to as cloud service embedding problem. In this invention, we investigate cloud service embedding problem over software-defined flexible grid transport SDN networks. The problem is formally defined as follow.

We are given a physical network topology $G(N, L)$, where N represents a set of physical nodes (PNs) and L represents a set of physical links (PLs) interconnecting physical nodes. Each node offers different types resources, for example, 1, 2, 3, ..., n, and the number of offered resources $C_j^n$ for each type j is given in advance. A node also consists of CDCG-ROADMs and variable rate transponders. CDCG-ROADM offers switching of flex-grid optical connections while variable rate transponders offer a set of modulation formats M, where the spectral efficiency $Z_m$ bit/second/Hz and transmission reach $D_m$ Km of each modulation format m is also given. A fiber offers total T THz of spectrum. A cloud demand is defined as $G'(V, E, C, L)$, where V is a set of virtual nodes (VNs), E is a set of virtual links (VLs) connecting virtual nodes, C is a set of requested resources $(C_i^1, C_i^2, \ldots, C_i^n)$ at each virtual node i, L is a set of requested line rate $l_{ij}$ between virtual nodes i and j. The arrival and departure distributions of cloud requests are given. The problem is how to map working and backup virtual nodes of a cloud demand over physical nodes (the survivable virtual node embedding problem) and working and backup virtual links of a cloud demand over physical links (the survivable virtual link embedding problem), such that the number of embedded cloud demands is maximized. The survivable virtual link embedding problem consists of sub-problems such as how to route working and backup virtual links over physical node-disjoint routes, how to assign wavelengths and allocate spectrum, and how to select modulation formats. It is assumed that a network does not support wavelength, spectrum, or modulation format conversion capability. On the other hand, the survivable virtual node embedding problem needs to map working and backup virtual nodes over distinct physical nodes.

Survivable cloud embedding mainly consists of survivable virtual node embedding and survivable virtual link embedding. Since physical node and link resources are shared among multiple could demands, an embedding procedure needs to ensure isolation of these resources while maintaining the resource capacity constraints. When mapping working and backup virtual nodes over physical nodes, a procedure needs to ensure that different working/backup virtual nodes cannot be mapped over the same physical node. Furthermore, any working and any backup nodes cannot be mapped on the same physical node. When mapping working and backup virtual links over physical routes through optical channels in flex-grid transport SDN, a procedure needs to ensure the wavelength continuity, and spectral continuity, spectral conflict constraints. The wavelength continuity constraint is defined as an allocation of spectrum at the same operating wavelength on all links along the route of an optical channel. The spectral continuity constraint is defined as an allocation of the same amount of spectrum on all links along the route of an optical channel. The spectral conflict constraint is defined as an allocation of non-overlapping spectrum to all channels routed through the same fiber. Furthermore, a procedure also needs to make sure that a selection of modulation format for a virtual link must support at least the physical distance of the physical route on which the virtual link is mapped. The constraint is referred to as the reachability constraint. The physical routers on which working and backup virtual links are mapped must be node-disjoint to ensure the resiliency in case of failures of data centers, ROADMs, or fibers.

There have been proposed several procedures for survivable virtual network mapping problem in IP networks, but these solutions cannot be directly applicable for software-defined flexible-grid optical transport networks due to the additional optical physics-oriented constraints. One proposal introduces the concept of content connectivity, and propose the ILP formulations for providing the survivable content connectivity in fixed-grid optical networks. However, the solution cannot be applicable to flexible-grid optical transport networks due to the additional spectral continuity and spectral conflict constraints. Similarly, another attempt proposes a procedure for mapping cloud demands over fixed-grid optical networks. Yet other solutions do not consider the issues related to the flexible selection of modulation formats and spectrum allocation as in flex-grid optical networks. Additionally, the solutions only consider a single link failure scenario.

None of the attempts heretofore provide for a cloud demand that is provisioned with the dedicated protection against any single link or node failure. The present invention provides the first ever solution for the survivable cloud service embedding problem.

BRIEF SUMMARY OF THE INVENTION

The present invention is directed to a method that includes implementing by a computer a cloud service embedding in a software defined flexible grid optical transport network, the implementing including mapping working and backup virtual nodes over physical nodes, mapping working and backup virtual links over physical routes which includes finding two pairs of node-disjoint routes using a disjoint pair procedure on an auxiliary graph, selecting a maximum number of virtual links whose node-disjoint routes are partitioned into two separate groups, allocating spectrum at lowest available wavelength on a selected physical route for a virtual link, and finding two pairs of node-disjoint routes using the disjoint pair procedure while modifying the auxiliary graph.

In an alternative embodiment of the invention, a non-transitory storage medium configured with instructions for a computer to carry out implementing by a computer a cloud service embedding in a software defined flexible grid optical transport network, the implementing including mapping working and backup virtual nodes over physical nodes, mapping working and backup virtual links over physical routes which includes finding two pairs of node-disjoint routes using a disjoint pair procedure on an auxiliary graph, selecting a maximum number of virtual links whose node-disjoint routes are partitioned into two separate groups, allocating spectrum at lowest available wavelength on a selected physical route for a virtual link, and finding two pairs of node-disjoint routes using the disjoint pair procedure while modifying the auxiliary graph.

These and other advantages of the invention will be apparent to those of ordinary skill in the art by reference to the following detailed description and the accompanying drawings.

BRIEF DESCRIPTION OF THE DRAWINGS

FIG. 1 is an diagram of an exemplary architecture of an optical transport software defined network SDN;

FIG. 3 is a diagram of Suurballe's procedure with VL independence.

FIG. 4 is a diagram of Suurballes's procedure with VL dependence.

FIGS. 5, 6 and 7 are a flowchart of Suurballe-based cloud service embedding, in accordance with the invention.

DETAILED DESCRIPTION

The present invention is directed to an efficient procedure, namely a Suurballe-based cloud service embedding procedure that first maps working and backup virtual nodes over physical nodes while balancing computational resources of different types, and finally, maps working and backup virtual links over physical routes while balancing network spectral resources using the Suurballe's procedure.

The procedure first maps working and backup virtual nodes (VNs) over physical nodes (PNs) while performing load balancing over node resources. The VNs are selected one-by-one in a descending order of the average requested computing resources. For the selected VN, a set of PNs are searched, which have at least the requested number of computational resources of each type. If the number of PNs within the found set is less than two, then the cloud demand is blocked. On the other hand, if the set contains at least two PNs, then the procedure selects two PNs from the set on which none of the VNs are yet mapped, and the PNs have the first and second largest average ratio of available to offered computing resources of the requested types. The procedure repeats the above method until all VNs are mapped.

Figure 2:
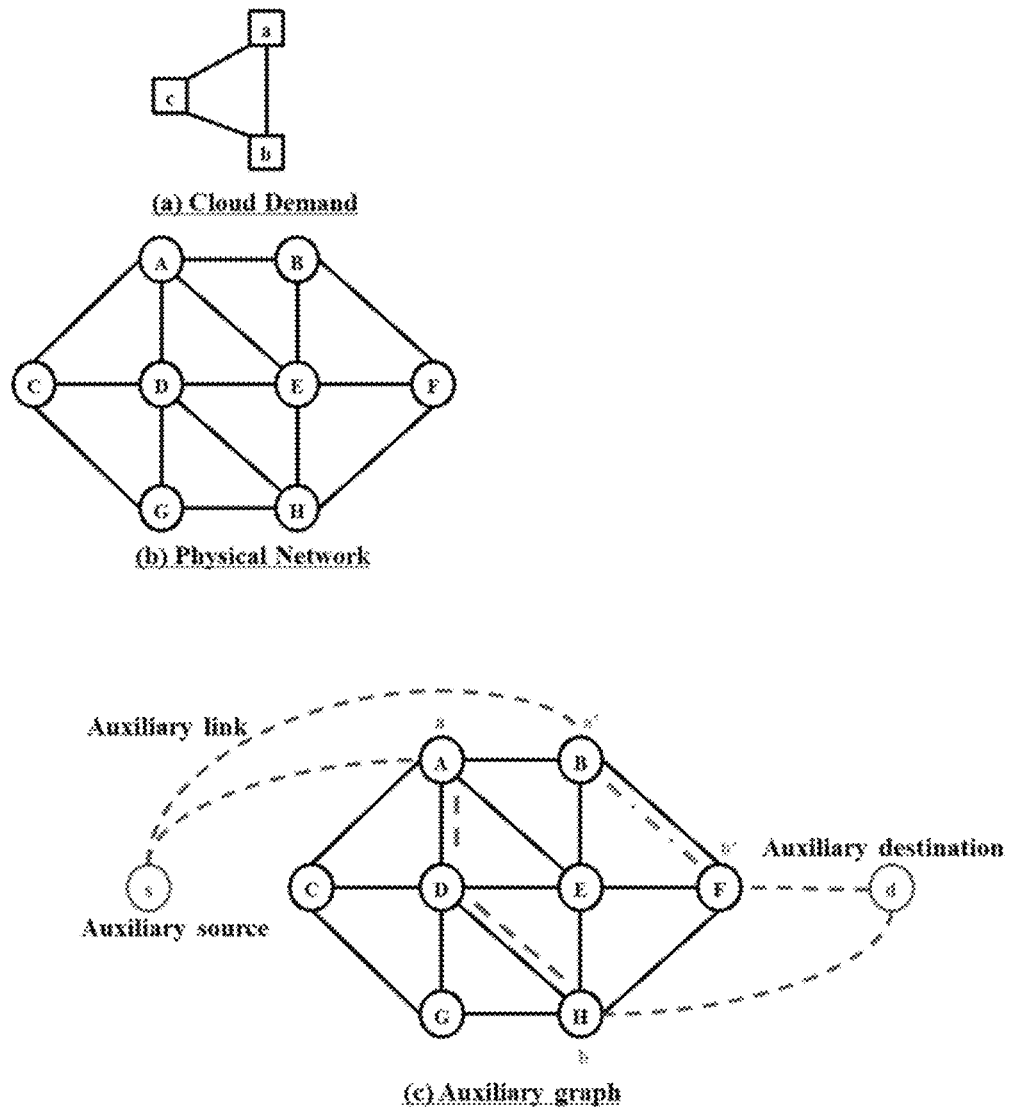
FIGS. 2 (a), (b), and (c) illustrates generation of an auxiliary graph.

After mapping VNs, the procedure maps working and backup virtual links (VLs) over physical links (PLs) while performing load balancing of spectral resources. The procedure selects a VL that is not yet considered. The procedure constructs an auxiliary graph by establishing auxiliary source and auxiliary destination nodes in the given physical network (PNet). The PNs associated with one of the end VNs of the VL are connected to the auxiliary source node and the PNs associated with the other VN are connected to the auxiliary destination node as shown in FIG. 2-(c). The procedure applies the Suurballe's procedure (FIG. 8) to find a pair of node-disjoint routes between auxiliary source and auxiliary destination nodes by considering the cost of PLs as a single hop. The procedure repeats the Suurballe's procedure to find another pair of node-disjoint routes between auxiliary source and auxiliary destination nodes by considering the cost of PLs as its physical distance. For each of the routes within these two pairs of node-disjoint routes, the procedure finds a modulation format that requires the minimum amount of spectrum while meeting the reachability constraint. Out of these two pairs of node-disjoint routes, the procedure selects a pair of node-disjoint routes that requires the minimum amount of cumulative spectrum in the network. The procedure repeats the same procedure to find a pair of link-disjoint routes for each VL. FIG. 3 illustrates the mapping of virtual links over physical routes.

In the next step, the procedure finds a set A consists of the maximum number of VLs those satisfies the following condition. One of the node-disjoint routes of a VL within set A is in set W, and the other node-disjoint route of the VL within set A is in set B. The routes in set W are also node-disjoint with the routes in set B. The procedure finds a set A with the maximum number of such VLs. The found node-disjoint routes of the VLs in set A are considered as the solution of mapping the VLs over physical routes. In the illustration of FIG. 3, the set A consists of VL (a, c) and (b, c). Out of the two node-disjoint routes of a VL, the shorter route is considered as the mapping of a working VL, while the longer route is considered as the mapping of a backup VL. In the next step, the procedure finds spectrum required for the selected modulation formats along the selected routes at the lowest available wavelengths for the working and backup VLs. If the procedure cannot find enough spectrum for either the working VL or the backup VL, then the procedure blocks the cloud demand. The procedure repeats the same process for all VLs within the set A.

In the next step, the procedure selects a VL with the maximum requested line rate, and which does not exist in the set A. For mapping these VLs, the procedure again applies the Suurballe's procedure while modifying the auxiliary graph as follows. The procedure constructs an auxiliary graph by connecting the selected PNs of one of the VNs to the auxiliary source node and the selected PNs of the other VN to the auxiliary destination node. In this auxiliary graph, the procedure removes those PLs and PNs along the physical routes on which backup VLs of the demand are already mapped. The procedure applies Step 201 through Step 205 of the Suurballe's procedure while considering the cost of a PL as a single hop. In the next step, the procedure restores the PLs and PNs along the physical routes on which backup VLs are already mapped, and removes those PLs and PNs along the physical routes on which working VLs of the demand are already mapped. Now, the procedure applies Step 206 and Step 207 of the Suurballe's procedure while considering the cost of a PL as a single hop. Among the found node-disjoint routes, a route that has at least one PL on which at least one of the working VLs is already mapped is considered as the mapping of the working VL and the mapping of the backup VL is considered on the other route. If this is not the case, then among the found node-disjoint routes, a route that has at least one PL on which at least one of the backup VLs is already mapped is considered as the mapping of the backup VL and the mapping of the working VL is considered on the other route. If this is also not the case, then the procedure selects the shortest route as the mapping of working VL, and the other route as the mapping of backup VL. The procedure repeats this modified Suurballe's procedure again while considering the cost of a PL as its physical distance, and finds another pair of link-disjoint routes. The procedure finds a modulation format for each of the found routes such that the required spectrum to support the requested line rate is minimized while meeting the reachability constraint. Out of the two pairs of link-disjoint routes, the procedure selects a pair of link-disjoint routes that cumulatively requires the least amount of spectrum in the network. FIG. 4 illustrates the scenario of mapping VL (a, b) using the Suurballe's procedure while modifying the auxiliary graph. The procedure finds spectrum for the selected modulation formats along the selected routes at the lowest available wavelengths for the working and backup VLs. If the procedure cannot find enough spectrum for either the working VL or the backup VL, then the procedure blocks the cloud demand. The procedure repeats the same process for all VLs those do not exist in the set A. Finally, the procedure provisions the working and backup VLs on the selected routes using the selected modulation formats by allocating spectrum at the found wavelengths, and also provisions the VNs by reserving the requested computational resources of each type at the selected PNs.

Figure 5:
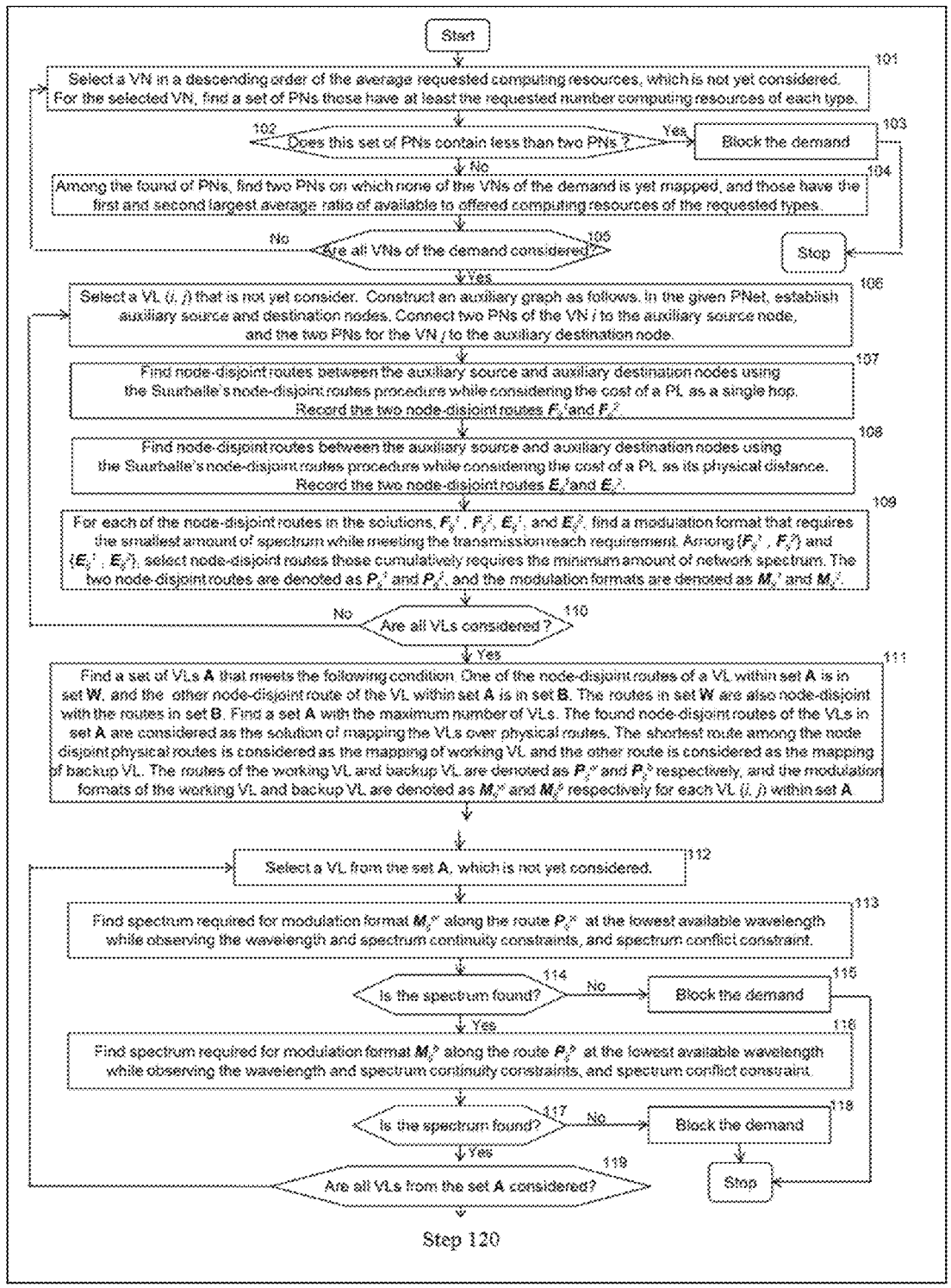
Figure 7:
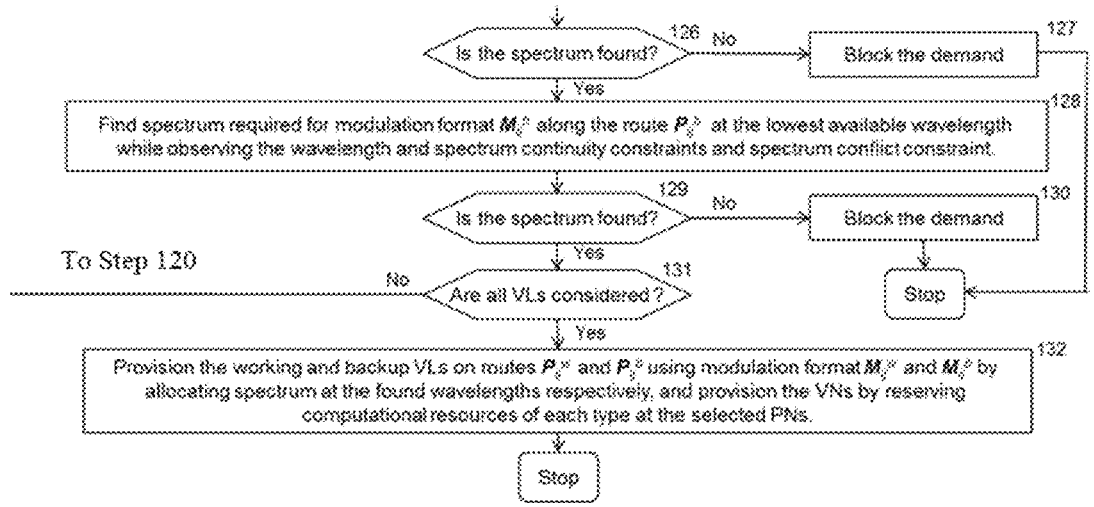

The detail procedure is described in terms of the flow chart as shown in FIGS. 5, 6 and 7.

At step 101: The procedure selects a VN in a descending order of the average requested computing resources, which is not yet considered. For the selected VN, the procedure finds a set of PNs those have at least the requested number computing resources of each type.

At step 102: The procedure checks whether the set of PNs contains less than two PNs. If the set contains at least two PNs, then the procedure follows Step 104, otherwise the procedure follows Step 103.

At step 103. The procedure blocks the cloud demand and terminates.

At step 104: The procedure finds two PNs among the found set of PNs on which none of the VNs of the demand is yet mapped, and those have the first and second largest average ratio of available to offered computing resources of the requested types.

At step 105: The procedure checks whether all VNs of the given cloud demand are considered. If at least one of the VNs is not yet considered, then the procedure follows Step 101, otherwise the procedure follows Step 106.

At step 106: The procedure selects a VL (i, j) that is not yet consider, and constructs an auxiliary graph as follows. In the given physical network (PNet), the procedure establishes auxiliary source and destination nodes. The procedure connects two PNs of the VN i to the auxiliary source node, and the two PNs for the VN j to the auxiliary destination node.

At step 107: The procedure finds node-disjoint routes between the auxiliary source and auxiliary destination nodes using the Suurballe's procedure (FIG. 3) while considering the cost of a PL as a single hop. The procedure records the two node-disjoint routes $F_{ij}^1$ and $F_{ij}^2$.

At step 108: The procedure finds node-disjoint routes between the auxiliary source and auxiliary destination nodes using the Suurballe's procedure (FIG. 3) while considering the cost of a PL as its physical distance. The procedure records the two node-disjoint routes $E_{ij}^1$ and $E_{ij}^2$.

At step 109: For each of the node-disjoint routes in the solutions, $F_{ij}^1$, $F_{ij}^2$, $E_{ij}^1$, and $E_{ij}^2$, the procedure finds a modulation format that requires the smallest amount of spectrum while meeting the transmission reach requirement. Among $\{F_{ij}^1, F_{ij}^2\}$ and $\{E_{ij}^1, E_{ij}^2\}$, the procedure selects node-disjoint routes those cumulatively requires the minimum amount of network spectrum. The two node-disjoint routes are denoted as $P_{ij}^1$ and $P_{ij}^2$, and the modulation formats are denoted as $M_{ij}^1$ and $M_{ij}^2$.

At step 110: The procedure checks whether all VLs are considered. If at least one of the VLs is not yet considered, then the procedure follows Step 106, otherwise the procedure follows Step 111.

At step 111: The procedure finds a set of VLs A that meets the following condition. One of the node-disjoint routes of a VL within set A is in set W, and the other node-disjoint route of the VL within set A is in set B. The routes in set W are also node-disjoint with the routes in set B. The procedure finds a set A with the maximum number of VLs. The found node-disjoint routes of the VLs in set A are considered as the solution of mapping the VLs over physical routes. The shortest route among the node disjoint physical routes is considered as the mapping of working VL and the other route is considered as the mapping of backup VL. The routes of the working VL and backup VL are denoted as $P_{ij}^w$ and $P_{ij}^b$ respectively, and the modulation formats of the working VL and backup VL are denoted as $M_{ij}^w$ and $M_{ij}^b$ respectively for each VL (i, j) within set A.

At step 112: The procedure selects a VL from the set A, which is not yet considered.

At step 113: The procedure finds spectrum required for modulation format $M_{ij}^w$ along the route $P_{ij}^w$ at the lowest available wavelength while observing the wavelength and spectrum continuity constraints, and spectrum conflict constraint.

At step 114: The procedure checks whether sufficient spectrum is available along the route. If sufficient spectrum is available, then the procedure follows Step 116, otherwise the procedure follows Step 115.

At step 115: The procedure blocks the cloud demand, and terminates.

At step 116: The procedure finds spectrum required for modulation format $M_{ij}^b$ along the route $P_{ij}^b$ at the lowest available wavelength while observing the wavelength and spectrum continuity constraints, and spectrum conflict constraint.

At step 117: The procedure checks whether sufficient spectrum is available along the route. If sufficient spectrum is available, then the procedure follows Step 119, otherwise the procedure follows Step 118.

At step 118: The procedure blocks the cloud demand, and terminates.

At step 119: The procedure checks whether all VLs with the set A considered. If at least one of VLs is not yet considered, then the procedure follows Step 112, otherwise, the procedure follows Step 120.

At step 120: The procedure selects a VL (i, j) with the maximum required line rate, which does not exist in the set A, and which is not yet considered.

At step 121: The procedure constructs an auxiliary graph for the VL (i, j) as follows. In the given PNet, establish auxiliary source and destination nodes. Connect two PNs of the VN i to the auxiliary source node, and the two PNs for the VN j to the auxiliary destination node.

At step 122: The procedure removes the PLs and PNs along the physical routes on which the backup VLs are already mapped from the auxiliary graph. The procedure applies Step 201 to Step 205 of the Suurballe's procedure while considering the cost of a PL as a single hop. Now, the procedure restores the PLs and PNs along the physical routes on which backup VLs are already mapped, and removes the PLs and PNs along the physical routes on which the working VLs are already mapped from the auxiliary graph. The procedure applies Step 206 to Step 207 of the Suurballe's procedure while considering the cost of a PL as a single hop. Among the found node-disjoint routes, a route that has at least one PL on which at least one of the working VLs is already mapped is considered as the mapping of the working VL and the mapping of the backup VL is considered on the other route. If this is not the case, then among the found node-disjoint routes, a route that has at least one PL on which at least one of the backup VLs is already mapped is considered as the mapping of the backup VL and the mapping of the working VL is considered on the other route. If this is also not the case, then select the shortest route as the mapping of working VL, and the other route as the mapping of backup VL.

The procedure records the routes for working VL in $F_{ij}^w$ and backup VL in $F_{ij}^b$.

At step 123: The procedure removes the PLs and PNs along the physical routes on which the backup VLs are already mapped from the auxiliary graph. The procedure applies Step 201 to Step 205 of the Suurballe's procedure while considering the cost of a PL as its physical distance. Now, the procedure restores the PLs and PNs along the physical routes on which backup VLs are already mapped, and removes the PLs and PNs along the physical routes on which the working VLs are already mapped from the auxiliary graph. The procedure applies Step 206 to Step 207 of the Suurballe's procedure while considering the cost of a PL as its physical distance. Among the found node-disjoint routes, a route that has at least one PL on which at least one of the working VLs is already mapped is considered as the mapping of the working VL and the mapping of the backup VL is considered on the other route. If this is not the case, then among the found node-disjoint routes, a route that has at least one PL on which at least one of the backup VLs is already mapped is considered as the mapping of the backup VL and the mapping of the working VL is considered on the other route. If this is also not the case, then select the shortest route as the mapping of working VL, and the other route as the mapping of backup VL.

The procedure records the routes for working VL in $E_{ij}^w$ and backup VL in $E_{ij}^b$.

At step 124: For each of the node-disjoint routes in the solutions, $F_{ij}^w$, $F_{ij}^b$, $E_{ij}^w$, and $E_{ij}^b$, the procedure finds a modulation format that requires the smallest amount of spectrum while meeting the transmission reach requirement. Among $\{F_{ij}^w, F_{ij}^b\}$ and $\{E_{ij}^w, E_{ij}^b\}$, the procedure selects node-disjoint routes those cumulatively requires the minimum amount of network spectrum. The two node-disjoint routes are denoted as $P_{ij}^1$ and $P_{ij}$, and the respective modulation formats for these routes are recorded in $M_{ij}^w$ and $M_{ij}^b$ respectively.

At step 125: The procedure finds spectrum required for modulation format $M_{ij}^w$ along the route $P_{ij}^w$ at the lowest available wavelength while observing the wavelength and spectrum continuity constraints and spectrum conflict constraint.

126: The procedure checks whether sufficient spectrum is available along the route. If sufficient spectrum is available, then the procedure follows Step 128, otherwise the procedure follows Step 127.

At step 127: The procedure blocks the cloud demand, and terminates.

At step 128: The procedure finds spectrum required for modulation format $M_{ij}^b$ along the route $P_{ij}^b$ at the lowest available wavelength while observing the wavelength and spectrum continuity constraints and spectrum conflict constraint.

At step 129: The procedure checks whether sufficient spectrum is available along the route. If sufficient spectrum is available, then the procedure follows Step 131, otherwise the procedure follows Step 130.

At step 130: The procedure blocks the cloud demand, and terminates.

At step 131: The procedure checks whether all VLs are considered. If at least one of the VLs is not yet considered, then the procedure follows Step 120, otherwise, the procedure follows Step 132.

At step 132: The procedure provisions the working and backup VLs on routes $P_{ij}^w$ and $P_{ij}^b$ using modulation format $M_{ij}^w$ and $M_{ij}^b$ by allocating spectrum at the found wavelengths respectively, and provisions the VNs by reserving computational resources of each type at the selected PNs.

Figure 8:
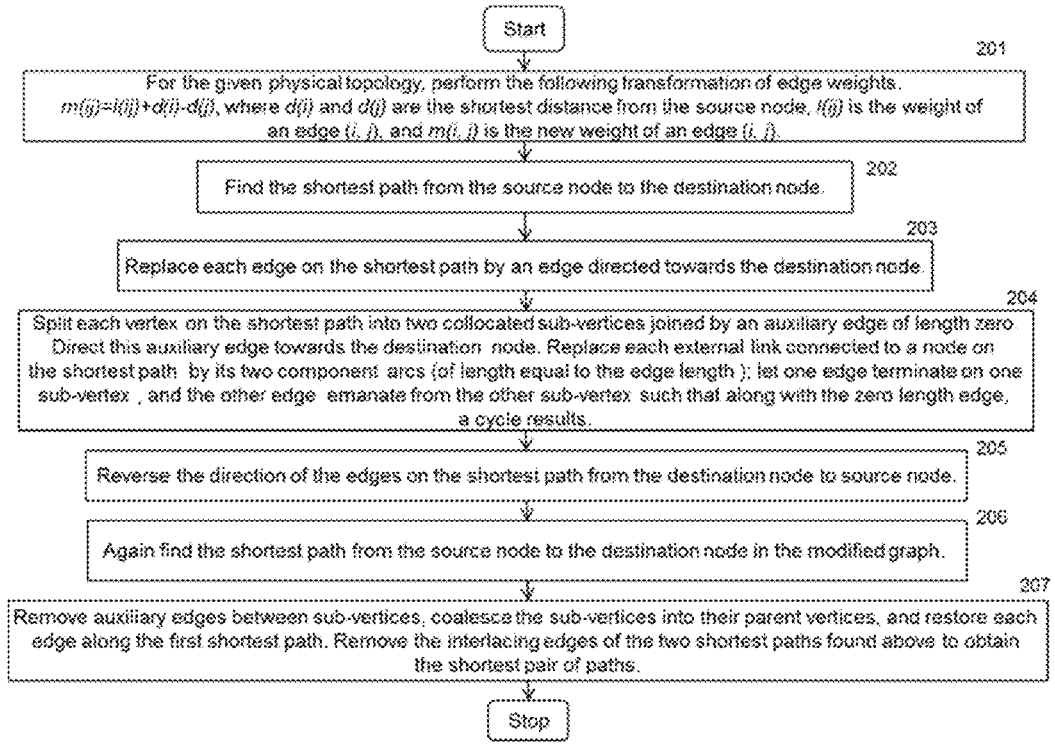
FIG. 8 is a flowchart of Suurballe's procedure to find node-disjoint routes.

The details of the Suurballe's procedure are described in terms of the flow chart as shown in FIG. 8.

At step 201: For the given physical topology, the procedure performs the following transformation of edge weights. m(ij)=l(ij)+d(i)−d(j), where d(i) and d(j) are the shortest distance from the source node, l(ij) is the weight of an edge (i, j), and m(i, j) is the new weight of an edge (i, j).

At step 202: The procedure finds the shortest path from the source node to the destination node.

At step 203: The procedure replaces each edge on the shortest path by an edge directed towards the destination node.

At step 204: The procedure splits each vertex on the shortest path into two collocated sub-vertices joined by an auxiliary edge of length zero. The procedure directs this auxiliary edge towards the destination node. The procedure replaces each external link connected to a node on the shortest path by its two component arcs (of length equal to the edge length); let one edge terminate on one sub-vertex, and the other edge emanate from the other sub-vertex such that along with the zero length edge, a cycle results.

At step 205: The procedure reverses the direction of the edges on the shortest path from the destination node to source node.

At step 206: The procedure again finds the shortest path from the source node to the destination node in the modified graph.

At step 207: The procedure removes auxiliary edges between sub-vertices, coalesces the sub-vertices into their parent vertices, and restores each edge along the first shortest path. The procedure removes the interlacing edges of the two shortest paths found above to obtain the shortest pair of paths.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 9:
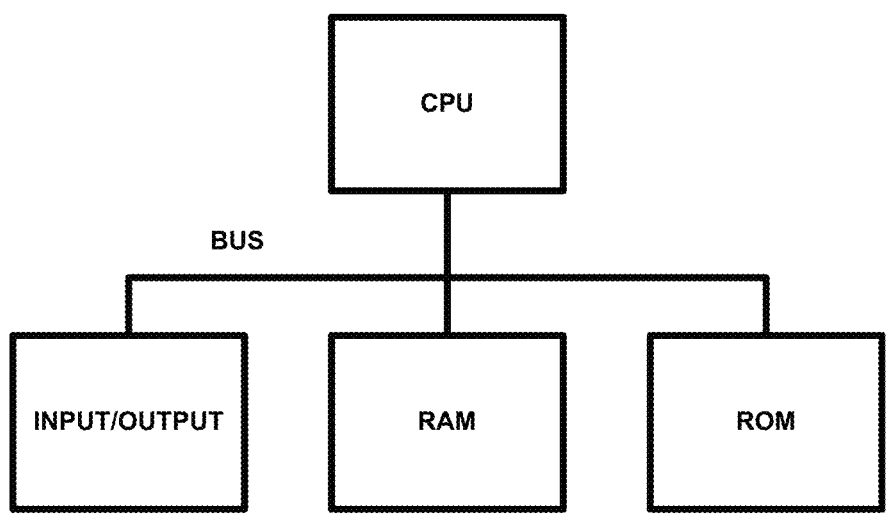
FIG. 9 shows an exemplary computer configuration to perform the invention.

By way of example, a block diagram of a computer to support the system is discussed next in FIG. 9. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can be appreciated that the invention is applicable in the optical control plane, such as Path Computation Element (PCE) and as an application in a software-defined controller, that application of the invention can embed the maximum number of cloud demands, and thus, enhance software defined transport network performance, and that the invention can minimize blocking probability of the cloud services in the network.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising the steps of:
 implementing by a computer a cloud service embedding in a software defined flexible grid optical transport network, the implementing comprising:
 mapping working and backup virtual nodes over physical nodes;
 mapping working and backup virtual links over physical routes which comprises:
 finding two pairs of node-disjoint routes using a disjoint pair procedure on an auxiliary graph;
 selecting a maximum number of virtual links whose node-disjoint routes are partitioned into two separate groups;

allocating spectrum at lowest available wavelength on a selected physical route for a virtual link; and finding two pairs of node-disjoint routes using the disjoint pair procedure while modifying the auxiliary graph.

2. The method of claim 1, wherein the disjoint pair procedure comprises Suurballe's procedure.

3. The method of claim 1, wherein the mapping working and backup virtual nodes over physical nodes comprises arranging virtual nodes in a descending order of average requested computing resources.

4. The method of claim 3, wherein the mapping working and backup virtual nodes over physical nodes comprises mapping working and backup virtual nodes to physical nodes with those having first and second largest average ration of available to offered computing resources of requested types.

5. The method of claim 1, wherein the step of finding two pairs of node-disjoint routes using a disjoint pair procedure on an auxiliary graph comprises considering cost of a physical link as a single hop and its physical distance and selecting a pair of node disjoint routes that cumulatively minimizes a required spectrum while not requiring any modification to the auxiliary graph while carrying out the disjoint pair procedure.

6. The method of claim 1, wherein the step of selecting a maximum number of virtual links comprises the routes in one group being also node disjoint to routes of other group.

7. The method of claim 1 wherein the step of allocating spectrum at lowest available wavelength on a selected physical route for a virtual link comprises minimizing fragmentation of spectrum and increasing probability of mapping virtual links over physical routes.

8. The method of claim 1, wherein the step of finding two pairs of node-disjoint routes using the disjoint pair procedure while modifying the auxiliary graph comprises considering cost of a physical link as a single hop and its physical distance, and selecting a pair of node-disjoint routes that cumulatively minimizes the required spectrum while modifying the auxiliary graph while applying the disjoint pair procedure to ensure a survivable mapping of a virtual link with respect to already mapped virtual links.

9. The method of claim 1, wherein the disjoint pair procedure comprises finding spectrum required for a modulation format along a route at a lowest available wavelength while observing the wavelength and spectrum continuity constraints and spectrum conflict constraint and provisioning working and backup virtual links on respective routes using respective modulation formats by allocating spectrum at found wavelengths respectively and provisioning virtual nodes by reserving computational resources of each type at selected physical nodes.

10. The method of claim 1, wherein the step of selecting a maximum number of virtual links whose node-disjoint routes are partitioned into two separate groups comprises finding a first set A of virtual links wherein one of the node-disjoint routes of a virtual link within the first set A being in a second set W, the other node-disjoint route of the virtual link within the first set A being in a third set B, the routes in the second set W also being node-disjoint with the routes in the third set B, finding the first set A with maximum number of virtual links, the found node-disjoint routes of the virtual links in the first set A being considered as a solution or mapping virtual links over physical routes.

11. The method of claim 1, wherein the step of selecting a maximum number of virtual links whose node-disjoint routes are partitioned into two separate groups comprises a shortest route among the node disjoint physical routes being considered as a mapping of working virtual links and the other route being considered as a mapping backup virtual links, the routes of working virtual links and backup virtual links being denoted as $P_{ij}^{W}$ and $P_{ij}^{b}$, respectively, and modulation formats of the working virtual link and backup virtual link being denoted $M_{ij}^{W}$ and $M_{ij}^{W}$, respectively, for each virtual link VL(i,j) within a first set.

12. A non-transitory storage medium configured with instructions for a computer to carry out the following steps:

implementing by a computer a cloud service embedding in a software defined flexible grid optical transport network, the implementing comprising:

mapping working and backup virtual nodes over physical nodes;

mapping working and backup virtual links over physical routes which comprises:

finding two pairs of node-disjoint routes using a disjoint pair procedure on an auxiliary graph;

selecting a maximum number of virtual links whose node-disjoint routes are partitioned into two separate groups;

allocating spectrum at lowest available wavelength on a selected physical route for a virtual link; and finding two pairs of node-disjoint routes using the disjoint pair procedure while modifying the auxiliary graph.

13. The medium of claim 12, wherein the mapping working and backup virtual nodes over physical nodes comprises arranging virtual nodes in a descending order of average requested computing resources.

14. The medium of claim 13, wherein the mapping working and backup virtual nodes over physical nodes comprises mapping working and backup virtual nodes to physical nodes with those having first and second largest average ration of available to offered computing resources of requested types.

15. The medium of claim 12, wherein the step of finding two pairs of node-disjoint routes using a disjoint pair procedure on an auxiliary graph comprises considering cost of a physical link as a single hop and its physical distance and selecting a pair of node disjoint routes that cumulatively minimizes a required spectrum while not requiring any modification to the auxiliary graph while carrying out the disjoint pair procedure.

16. The medium of claim 12 wherein the step of allocating spectrum at lowest available wavelength on a selected physical route for a virtual link comprises minimizing fragmentation of spectrum and increasing probability of mapping virtual links over physical routes.

17. The medium of claim 12, wherein the step of finding two pairs of node-disjoint routes using the disjoint pair procedure while modifying the auxiliary graph comprises considering cost of a physical link as a single hop and its physical distance, and selecting a pair of node-disjoint routes that cumulatively minimizes the required spectrum while modifying the auxiliary graph while applying the disjoint pair procedure to ensure a survivable mapping of a virtual link with respect to already mapped virtual links.

18. The medium of claim 12, wherein the disjoint pair procedure comprises finding spectrum required for a modulation format along a route at a lowest available wavelength while observing the wavelength and spectrum continuity constraints and spectrum conflict constraint and provisioning working and backup virtual links on respective routes using respective modulation formats by allocating spectrum at found wavelengths respectively and provisioning virtual nodes by reserving computational resources of each type at selected physical nodes.

19. The medium of claim 12, wherein the step of selecting a maximum number of virtual links whose node-disjoint routes are partitioned into two separate groups comprises finding a first set A of virtual links wherein one of the node-disjoint routes of a virtual link within the first set A being in a second set W, the other node-disjoint route of the virtual link within the first set A being in a third set B, the routes in the second set W also being node-disjoint with the routes in the third set B, finding the first set A with maximum number of virtual links, the found node-disjoint routes of the virtual links in the first set A being considered as a solution or mapping virtual links over physical routes.

20. The medium of claim 12, wherein the step of selecting a maximum number of virtual links whose node-disjoint routes are partitioned into two separate groups comprises a shortest route among the node disjoint physical routes being considered as a mapping of working virtual links and the other route being considered as a mapping backup virtual links, the routes of working virtual links and backup virtual links being denoted as $P_{ij}^{W}$ and $P_{ij}^{b}$, respectively, and modulation formats of the working virtual link and backup virtual link being denoted $M_{ij}^{W}$ and $M_{ij}^{W}$, respectively, for each virtual link VL(i,j) within a first set.

* * * * *